United States Patent

[11] 3,621,372

| [72] | Inventors | Thomas O. Paine<br>Administrator of the National Aeronautics and Space Administration with respect to an invention of;<br>Roland L. Hron, Bloomington, Minn. |
|---|---|---|
| [21] | Appl. No. | 59,969 |
| [22] | Filed | July 31, 1970 |
| [45] | Patented | Nov. 16, 1971 |

[54] LOAD CURRENT SENSOR FOR A SERIES PULSE-WIDTH MODULATED POWER SUPPLY
4 Claims, 2 Drawing Figs.

[52] U.S. Cl. .................................................. 323/17, 321/2, 323/22 T, 323/DIG. 1
[51] Int. Cl. .................................................. G05f 1/56
[50] Field of Search .......................................... 323/4, 18, 20, 22 T, 38, DIG. 1; 321/2

[56] References Cited
UNITED STATES PATENTS

| 3,368,139 | 2/1968 | Wuerflein | 323/22 T |
| 3,093,790 | 6/1963 | Ehret | 323/DIG. 1 |
| 3,356,930 | 12/1967 | Lupoli | 323/20 |
| 3,384,806 | 5/1968 | Hartman | 323/22 T |
| 3,523,239 | 8/1970 | Heard | 323/20 |

Primary Examiner—A. D. Pellinen
Attorneys—R. F. Kempf, N. B. Siegel and John R. Manning ABSTRACT: A load current sensor for use with a pulse width modulated power source and has an output filter inductor connected in series between a load and a pulse width modulated regulator. This inductor stores a portion of each pulse supplied to the load by the regulator. At the end of each pulse the stored energy in the inductor causes the current to continue flowing through the load via a freewheeling diode. This current is sampled by a sensor which is connected across the freewheeling diode and the series circuit made up of the output filter inductor and the load. The sensor comprises a gated transistor switch connected in series with a pulse transformer. The freewheeling diode has a forward conductance threshold (forward resistance) which is greater in magnitude than the series impedance of the transistor switch and the pulse transformer.

PATENTED NOV 16 1971  3,621,372

INVENTOR
ROLAND L. HRON

BY  *Neil B. Siegel*
ATTORNEYS

3,621,372

LOAD CURRENT SENSOR FOR A SERIES PULSE-WIDTH MODULATED POWER SUPPLY

ORIGIN OF THE INVENTION

The invention described herein was made in performance of work under a NASA contract and is subject to the provisions of Section 305 of the National Aeronautics and Space Act of 1958, Public Law 85-568 (72 Star. 435; 42 U.S.C. 2457).

BACKGROUND OF THE INVENTION

This invention relates generally to pulse width modulated power sources and more particularly to a device for sensing the current applied by pulse width modulated power supply to a battery of other load.

The batteries or other loads of spacecraft are often charged or powered by converting solar energy into a DC electrical current signal and applying the signal to the batteries or loads. The current signal is frequently controlled by a pulse width modulated regulator which chops the DC signal into a series of pulses. In order to ensure that the load is being powered at all times, the current pulses provided by the regulator must be measured.

In the prior art various methods for sensing the load current are known. One logical arrangement for monitoring the load or battery charge current is to connect a sensing circuit in series with the load. However, because such a circuit continuously consumes power, this is clearly an undesirable arrangement. Also, a series connected sensor circuit reduces the level of the voltage applied to the load, whereas it is desireable that the load receive the full benefit of each voltage pulse supplied by the regulator.

For aerospace applications it is important that the load current sensor be as small and light weight as possible. However, if the sensor remains in on "ON" condition for a long period of time it must be relatively large in order to withstand the power supplied to it. For this reason, it is also desirable that such a sensor be of the type which merely samples the load current.

It is an object of this invention to provide a new and improved sensor for measuring pulse load current.

It is also an object of this invention to provide a sensor for measuring pulse load current that does not reduce the voltage applied to, nor borrow current from, the load.

It is a further object of this invention to provide a sensor for measuring the current supplied by a series pulse width modulator to a battery which does not reduce the battery voltage, dies not consume excessive power from the battery, gives an accurate measurement, and is small in size and light in weight.

SUMMARY OF INVENTION

In accordance with principles of this invention, a current sensor is connected in circuit with a load, (which may be a battery, for example) to sample the load current. When a pulse width modulated regulator supplies a voltage pulse to the load, the sensor is connected in parallel with the regulator. However, the sensor does not borrow any current from the load because it is cut off. A storage element, connected in series with the load, stores part of the energy of the supplied pulse. At the end of the pulse, the stored energy continues current flow through the load. At this point, the sensor circuit is turned on and is connected in series with the storage element to sense the load current. Once the load current has been sampled, the sensor circuit is again cut off. The storage element continues to discharge through a freewheeling diode until another voltage pulse is received from the regulator. Thus, while an accurate "series type" measurement of the load current is made by the sensor, only a minimum of load power is consumed.

BRIEF DESCRIPTION OF THE DRAWINGS

The foregoing and other objects, features and advantages of the invention will become more apparent from the following more particular description of a preferred embodiment of the invention as illustrated in the accompanying drawings, wherein.

DESCRIPTION OF THE PREFERRED EMBODIMENT

Figure 1:
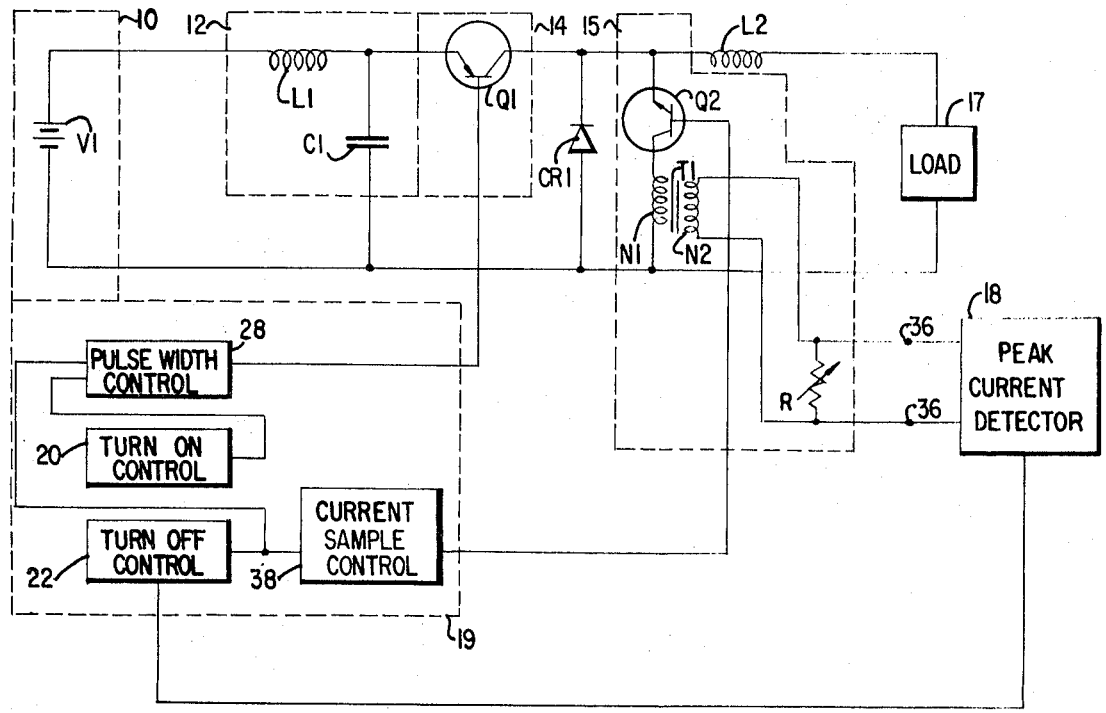
FIG. 1 is a partially block and partially schematic diagram of a pulse width modulated power supply system including the invention; and, FIGS. 2 A-E are graphical representations of the voltage at, and current flowing through, various segments of the power supply illustrated in FIG. 1.

FIG. 1 illustrates a preferred embodiment of the invention connected in a pulse width modulated power supply system. The pulse width modulated power supply system illustrate in FIG. 1 comprises: a DC voltage source 10; and LC high-frequency filter 12; a gate 14; a sensor 15; a load 17, which may be a battery, for example; a peak current detector 18; and, a control system 19.

While the DC voltage source 10, can be any DC voltage source, for ease of description, it is illustrated in FIG. 1 as a battery designated V1. The LC high-frequency filter 12 comprises an inductor designed L1 and a capacitor designated C1. One end of L1 is connected to the positive terminal of V1 and the other end of L1 is connected to one end of C1. The other end of C1 is connected the the negative terminal of V1. The gate 14 is formed of a PNP transistor designated Q1. The emitter of Q1 is connected to the junction between L1 and C1. The cathode of a freewheeling diode designated CR1 is connected to the collector of Q1. The anode of CR1 is connected to the junction between C1 and V1.

The sensor 15, illustrated in FIG. 1, comprises: an NPN transistor designated Q2; and, a pulse transformer designated having primary and secondary windings designated N1 and N2, respectively. The emitter of Q2 is connected to the cathode of CR1 and one end of an output filter inductor or storage element L2. The collector of Q2 is connected through N1 to the negative terminal of V1. N2 is connected in parallel with a variable resistor designated R across a pair of sensor output terminals 36 which, in turn, are connected to the peak current detector 18. The load 17 is connected at one end to the other end of L2 and at the other end to the negative terminal of V1.

The control system 19 comprises: a pulse width control 28; a turn-on control 20; a turn off control 22, and, a current sample width control 38. The output of the turn-on control 20 and the turnoff control 22 are connected to inputs of the pulse width control 28. The output of the pulse width control is connected to the base of Q1. The output of the turn off control 22 is also connected to the input of the current sample pulse width control 38. Also, the output of the current sample pulse width control 38 is connected to the base of Q2. Finally, the output of the peak current detector is connected to the input at the turn off control 22.

It will be obvious to those skilled in the art of pulse width modulators that the various subsystems just described perform various functions. For example, the LC high-frequency filter 12 minimized input ripple. In addition, the gate 14 is cut on and off in accordance with the output of pulse width control 28, which, in turn, is controlled by the outputs of turn-on control 20 and turnoff control 22. In other words, the LC high-frequency filter 12, the DC voltage source 10, the gate, 14, the freewheeling diode CR1, the output filter (L2) and the control system form a regulated pulse width modulated power supply.

Q2 and N1 of T1 are connected across CR1 and sample load current flow in the novel manner hereinafter described. More specifically, sampling current is taken from N2 as Q2 is turned on and off by the current sample pulse width control in the manner hereinafter described.

Figure 2:
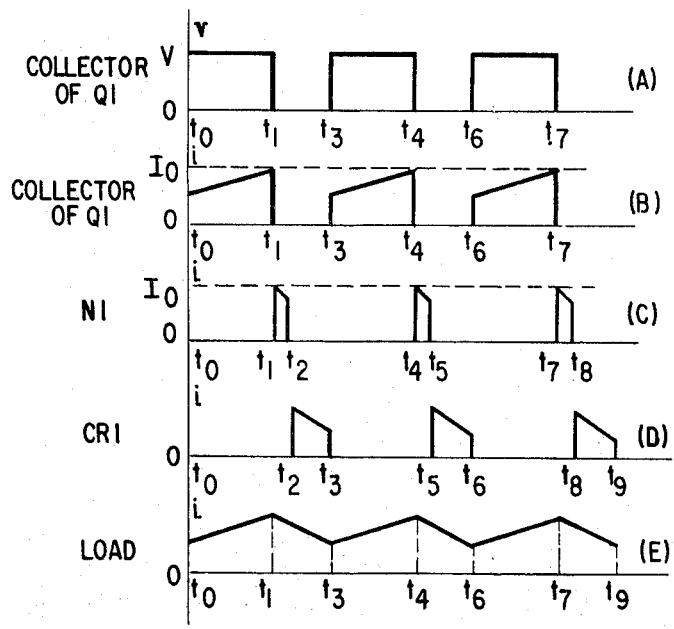

In operation, the pulse width control 28 turns the gate 14 on and of so as to produce a rectangular voltage wave from at the collector of Q1, as is shown on the line A of FIG. 2. When the gate 14 is first turned on by the pulse width control 18 at $t_0$, the voltage appearing at the emitter of Q2 is +V. Zero current flows through CR1 at this time because it is reverse biased. In addition, zero current flows through Q2 at $t_0$ because it is turned off. However, due to the energy stored by L2 the current flowing through the collector of Q1 appears as shown on line B of FIG. 2.

At time $t_1$, the turnoff control 22 activates the pulse width control 28 to turn off gate 14. At the same time, the turnoff control 22 activates the current sample pulse width control 38 to turn on Q2. The energy stored in L2 prevents a sudden decrease in the load current so that between $t_1$ and $t_2$, L2 maintains a decaying current through the circuit made up of the load 17, T1, and Q2. The turns ratio of T1 and the size of R are chosen so as to present a very small impedance through that leg of this circuit. In fact, the impedance is so small that the current flowing through T1 and Q2 produce such a small voltage drop across CR1 that the threshold voltage required for forward conductance through CR1 is not reached. Therefore, when Q2 is on, most of the return current flows through the transformer T1 with only an insignificant portion flowing through CR1.

At time $t_2$, the current sample pulse width control 38 turns off Q2. Line C of FIG. 2 shows the wave form of the current flowing through Q2 from $t_1$ to $t_2$. During the period from $T_2$ to $T_2$, L2 is beginning to discharge its stored energy through the load 17. When Q2 is turned off at $t_2$, the threshold voltage required for the forward conduction of CR1 is surpassed and it begins to conduct. Thereafter, L2 continues to discharge its stored energy through the load 17 and CR1. This discharge creates a current wave at the cathode of CR1 of the type illustrated on line D of FIG. 2. Consequently, the waveform of the current flowing through the load 17 is a combination of lines B, C and D as illustrated on line E of FIG. 2.

The current flow that is important to this invention is that flowing through the emitter of Q2 and shown on line C of FIG. 2 because this is the current flowing through N1 of T1. As seen on line C of FIG. 2, this current flow comprises a series of pulses. The peak amplitude of each pulse is $I_0$. LIne B shows that $I_0$ is the steady state current which flows through the load 17 when a particular voltage, is applied to the series circuit comprising the load on L2. In other words, the peak amplitude, $I_0$, of the current flowing through N1 is directly related to the peak amplitude, $I_0$, of the current flowing through the load 17 when Q1 is on.

The following formula can be used to express a voltage appearing at the sensor output terminals 36:

$V_R = N_1/N_2 (R) I$ where:
 $V_R$ = voltage appearing across R;
 $N_1$ = number of turns in N1;
 $N_2$ = number of turns in N2;
 R = value of R; and,
 I = the current flowing through N1.

Hence, by adjusting R the voltage appearing at the sensor output terminals 36 can be made to match the threshold level of the peak current detector 18 and, thus control the timing of the turn off control 22 for the next cycle of operation. A new cycle is started by the turn-on control in accordance with the operation of cyclic electronic means (not shown).

It will be appreciated by those skilled in the art that the sensor of this invention does not borrow current from the load, as do other sensors which are connected in parallel with the load. Also, it does not consume excessive power, as do other sensors which are connected in series with the load. In addition, because it is small in size and light in weight, it is suitable for aerospace applications.

While the invention has been particularly show and described with reference to a preferred embodiment, it will be understood by those skilled in the art that various changes in form and detail may be made therein without departing from the spirit and scope of the invention. For example, while the sensor is illustrated as connected to automatically regulate the load current $I_L$, it may be connected to an alarm device in order to provide a warning when an over current of a short circuit condition occurs.

What is claimed is:

1. In a pulse width modulated converter including a first gate for controlling power flow from a primary source to an output load wherein said converter provides different exclusive current paths through the load at different times including a first current path for providing power to said load when said first gate is conducting which first path includes said first gate and a series inductor, and wherein said converter provides a second current path through said load when said first gate is nonconducting, said second path includes said series inductor and a unidirectional semiconductor means, The IMPROVEMENT COMPRISING a load current sampling means for nondissapative sampling of said load current for a short duration during said period when said first gate is nonconducting, said load current sampling means providing a third path for said load current when said first gate is nonconducting, said third current path including said inductor.

2. In the converter of claim 1, the load current sampling means comprising a second gate and a pulse transformer, wherein the sum of resistance of the second gate when switched into conduction and the resistance of the pulse transformer is predetermined so that the combined voltage drop across said second gate and said pulse transformer is less than the forward voltage drop across said unidirectional semiconductor means.

3. In the converter of claim 2, the load current sampling means further comprising control means for closing said second gate means for a portion of the period when said first gate means is opened thereby enabling said third current path to carry all current through the load.

4. In the converter of claim 3, the control means further including means for opening said second gate means after a short sampling interval when said first gate means remains open thereby enabling said second current path to carry all current through the load.

* * * * *